US008701292B2

(12) United States Patent
    Markwardt

(10) Patent No.: US 8,701,292 B2
(45) Date of Patent: Apr. 22, 2014

(54) MULTI-PURPOSE COOKING TOOL

(76) Inventor: Terry Markwardt, Austin, TX (US)

(*) Notice: Subject to any disclaimer, the term of this patent is extended or adjusted under 35 U.S.C. 154(b) by 1946 days.

(21) Appl. No.: 11/195,238

(22) Filed: Aug. 2, 2005

(65) Prior Publication Data
    US 2007/0028913 A1    Feb. 8, 2007

(51) Int. Cl.
    *F24B 3/00* (2006.01)
(52) U.S. Cl.
    USPC .......................................... 30/142; 126/25 R
(58) Field of Classification Search
    USPC ............. 15/236.01, 236.05, 236.06, 236.07,
        15/236.08, 236.09; 30/142, 322, 323, 169,
        30/171, 172; 126/25, 25 R; 294/26, 50.6;
        D32/49, 46; D8/8–20
    See application file for complete search history.

(56) References Cited

U.S. PATENT DOCUMENTS

| | | | |
|---|---|---|---|
| 790,228 A | | 5/1905 | Ronrer |
| 1,711,916 A | * | 5/1929 | Atkinson ..................... 294/53.5 |
| 2,253,116 A | * | 8/1941 | Findlay ........................... 172/13 |
| 2,824,323 A | * | 2/1958 | Oreste Tos et al. ............. 15/105 |
| 3,739,562 A | * | 6/1973 | McNamara ................. 56/400.06 |
| 3,797,581 A | * | 3/1974 | Holloway ....................... 172/372 |
| D264,543 S | * | 5/1982 | Ashley ............................ D32/49 |
| 4,334,583 A | * | 6/1982 | Parker ........................... 172/375 |
| 4,700,420 A | * | 10/1987 | Belanger ........................... 7/114 |
| D304,892 S | | 12/1989 | Bevilacqua |
| D307,100 S | * | 4/1990 | Roman ............................. D8/11 |
| 5,729,854 A | * | 3/1998 | Powers ........................... 7/109 |
| 5,813,120 A | | 9/1998 | Stroh |
| 5,971,653 A | * | 10/1999 | Harpell ........................... 403/97 |
| 5,987,693 A | | 11/1999 | Noga |
| 6,536,118 B1 | * | 3/2003 | Campbell ........................ 30/322 |
| D519,698 S | * | 4/2006 | Jones ............................. D32/49 |
| 7,039,983 B1 | * | 5/2006 | Outlaw ........................... 15/111 |
| 2004/0006876 A1 | * | 1/2004 | Popeil et al. ................... 30/323 |

* cited by examiner

*Primary Examiner* — Ghassem Alie
(74) *Attorney, Agent, or Firm* — David D. Griner; Abel Law Group, LLP

(57) ABSTRACT

A multi-purpose cooking tool including an elongated shaft, a handle, a first hook-like member, a second hook-like member and a grill engaging recess. The elongated shaft has a first end and a second end. The handle is provided at the first end of the elongated shaft. The first hook-like member, the second hook-like member and the grill rail engaging recess are provided at the second end of the elongated shaft. The first hook-like member has a counter-clockwise curvature with respect to a longitudinal axis of the elongated shaft and the second hook-like member has a clockwise curvature with respect to the longitudinal axis of the elongated shaft.

14 Claims, 3 Drawing Sheets

MULTI-PURPOSE COOKING TOOL

TECHNICAL FIELD OF THE INVENTION

The disclosures made herein relate generally to tools used for cooking food and, more particularly, to tools used for cleaning barbecue grills and/or for manipulating food while cooking.

BACKGROUND OF THE INVENTION

Various types and configurations of tools used during the activity of barbecuing food are well known. Such tools are broadly referred to herein as conventional barbecuing tools. Examples of such conventional barbecuing tools include, but are not limited to, tools for manipulating food (e.g., forks, tongs, spatulas, etc.) and tools for cleaning rails of a barbecue grill (i.e., grill rails).

Certain conventional barbecuing tools are multi-purpose. Of particular relevance to the present invention are conventional barbecuing tools that provide for both manipulating of food and for cleaning of grill rails. While such multi-purpose conventional barbecuing tools attempt to add convenience through combining of two functions, they are not without shortcomings with respect to such two functions. For example, U.S. Pat. No. 5,813,120 to Stroh discloses a multi-purpose tool configured for manipulating food items on a grill and for cleaning grill rails. The tool includes a single hook-like structure configured for piercing food items for enabling them to be turned over or moved and includes a grill cleaning member in combination with the hook-like structure. The hooklike structure is curved in either a clockwise or counter-clockwise direction with respect to a longitudinal axis of a handle of the tool. Accordingly, as disclosed by Stroh, a different tool is required to provide for preferred dexterity in use of the tool. A right-handed person will generally be most proficient and comfortable in manipulating a tool having a hook-like structure formed in a clockwise direction (e.g., as depicted in FIG. 1 of U.S. Pat. No. 5,813,120) and a left-handed person will generally be most proficient and comfortable in manipulating a tool having a hook-like structure formed in a counter clockwise direction (e.g., as depicted in FIG. 3 of U.S. Pat. No. 5,813,120).

Therefore, a multi-purpose barbecuing tool that provides for both manipulating of food and for cleaning of grill rails and that overcomes shortcomings associated with conventional barbecuing tools would be useful, advantageous and novel.

SUMMARY OF THE INVENTION

Embodiments of the present invention relate to a multi-purpose cooking tool. More specifically, embodiments of the present invention are cooking tools that provide for both manipulating of food items and for cleaning of grill rails. Additionally, cooking tools in accordance with the present invention are configured for providing both right-handed users and left-handed users with preferred dexterity (e.g., direction of rotation) during use of such multi-purpose cooking tools. In doing so, embodiments of the present invention advantageously overcome one or more shortcomings associated with conventional multi-purpose cooking tools.

In one embodiment of the present invention, a cooking tool head comprises a first hook-like member having a counter-clockwise curvature with respect to a longitudinal reference axis, a second hook-like member having a clockwise curvature with respect to the longitudinal axis and at least one grill rail engaging recess.

In another embodiment of the present invention, a cooking tool head comprises a flat body having generally parallel opposed faces. The flat body includes a plurality of hook-like members extending therefrom and at least one grill rail engaging recess formed therein. A first one of the hook-like members has a counter-clockwise curvature with respect to a reference axis extending, generally perpendicular to the opposed faces and a second one of the hook-like members has a clockwise curvature with respect to the reference axis.

In another embodiment of the present invention, a multi-purpose cooking tool comprises an elongated shaft, a handle, a first hook-like member, a second hook-like member and a grill engaging recess. The elongated shaft has a first end and a second end. The handle is provided at the first end of the elongated shaft. The first hook-like member, the second hook-like member and the grill rail engaging recess are provided at the second end of the elongated shaft. The first hook-like member has a counter-clockwise curvature with respect to a longitudinal axis of the elongated shaft and the second hook-like member has a clockwise curvature with respect to the longitudinal axis of the elongated shaft.

Turning now to specific aspects of the present invention, in at least one embodiment, the first hook-like member, the second hook-like member and the at least one grill rail engaging recess are all integral components of a flat body.

In at least one embodiment of the present invention, a tip portion of the first hook-like member opposes a tip portion of the second hook-like member.

In at least one embodiment of the present invention, a plurality of grill rail engaging recesses is provided and a first one of the grill rail engaging recesses is configured differently than a second one of the grill rail recesses.

In at least one embodiment of the present invention, the first hook-like member, the second hook-like member and the plurality of grill rail engaging recesses are all integral components of a flat body, and each one of the grill rail engaging recesses is formed in a common edge portion of the flat body bound between the hook-like members.

These and other objects, embodiments, advantages and/or distinctions of the present invention will become readily apparent upon further review of the following specification, associated drawings and appended claims.

DETAILED DESCRIPTION OF THE PREFERRED EMBODIMENTS

Figure 1:
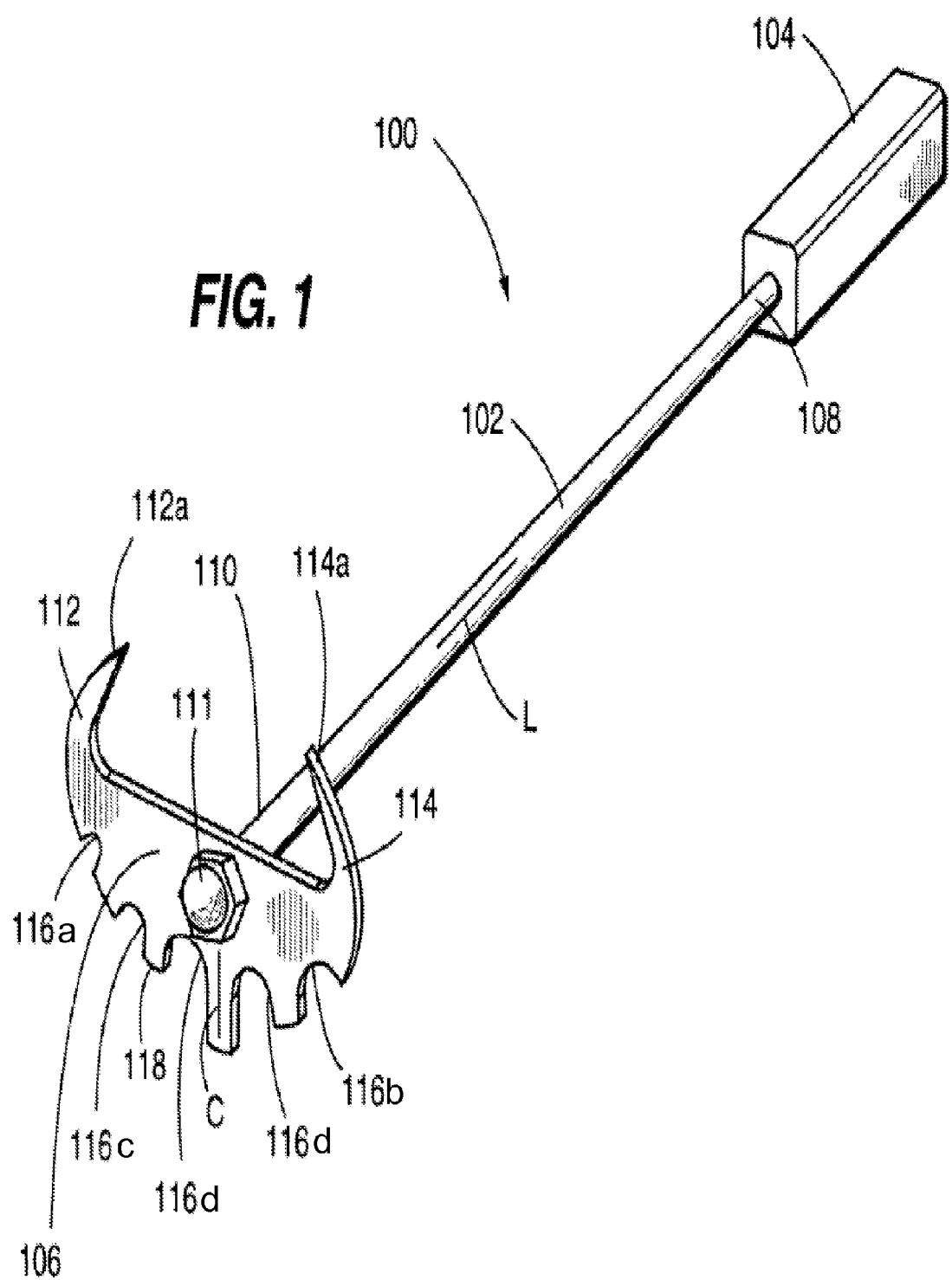
FIG. 1 depicts an embodiment of a multi-purpose cooking tool in accordance with the present invention.

FIG. 1 depicts a multi-purpose cooking tool in accordance with the present invention, which is referred to herein as the multi-purpose cooking tool 100. The multipurpose cooking tool 100 includes an elongated shaft 102, a handle 104 and a head 106. The handle 104 is provided at a first end 108 of the elongated shaft 102. As depicted, the handle 104 is a discrete item attached to the first end 108 of the elongated shaft 102 (e.g., having the first end 108 presses into a bore of the handle 104). It is disclosed herein that, in alternate embodiments, the handle 104 may be integrally formed with the elongated shaft 102 (e.g., a helically wound portion). The head 106 is provided at a second end 110 of the elongated shaft 102. As depicted, the head 106 is formed from a flat piece of material and is attached through use of threaded fasteners (e.g., a threaded stud at the elongated member 102 engaged by a nut 111). It is disclosed herein that, in alternate embodiments, the head 106 may be attached via means such as, for example, welding, swaging or riveting.

The various components of the multi-purpose cooking tool 100 may be made from a variety of different respective materials. Examples of materials from which the elongated shaft 102 is made include, but are not limited to, steel, aluminum, plastic and wood. Examples of materials from which the handle 104 is made include, but are not limited to, steel, aluminum, plastic, wood. Examples of materials from which the head 106 is made include, but are not limited to, steel and aluminum.

The head 106 includes a first hook-like member 112, a second hook-like member 114 and a plurality of grill rail engaging recesses 116a, 116b, 116c, and 116d. Accordingly, the first hook-like member 112, the second hook-like member 114 and the plurality of grill rail engaging recesses 116a-d are all integral components of the head 106. It is disclosed herein that, in alternate embodiments, the first hook-like member 112, the second hook-like member 114 and/or the plurality of grill rail engaging recesses 116a-d are discrete components. For example, in such an alternate embodiment, the hook-like members (112, 114) are formed at opposing ends of a metal rod and each grill rail engaging recesses 116a-d are formed in discrete components that are attached to the metal rod.

The first hook-like member 112 has a counter-clockwise curvature with respect to a longitudinal axis L of the elongated shaft 102 (i.e., as viewed looking along the elongated shaft 102 toward the second end 110). The second hook-like member 114 has a clockwise curvature with respect to the longitudinal axis L of the elongated shaft 102. The first hook-like member 112 and the second hook-like member 114 are in spaced apart relationship such that the respective tip portions (112a, 114a) of the first hook-like member 112 and the second hook-like member 114 are opposed to each other.

Each one of the grill rail engaging recesses 116a-d is formed in a common edge portion 118 of the head 106 between the hook-like members. As depicted, the head 106 includes four different sizes of grill rail engaging recesses. A first size recess 116a (i.e., a smallest size) is positioned closest to the first hook-like member 112. A second size recess 116b (i.e., a largest size) is positioned closest to the second hook-like member 114. A third size recess 116c (i.e., a first intermediate size) is positioned immediately adjacent the first size recess 116a. A pair of fourth size recesses 116d (i.e., second intermediate size) are positioned between the second size recess 116b and the third size recess 116c.

The pair of fourth size recesses 116d are preferably, but not necessarily, positioned equidistant from a centerline C of the head 106. It is disclosed herein that the present invention is not limited to particular relative sizes and/or positioning of the various grill rail engaging recesses 116.

As depicted, each one of the grill rail engaging recesses 116 has a generally semi-circular profile. However, it is disclosed herein that one or more of the plurality of grill rail engaging recesses 116 may have a profile other than semi-circular (e.g., v-shaped).

Figure 2:
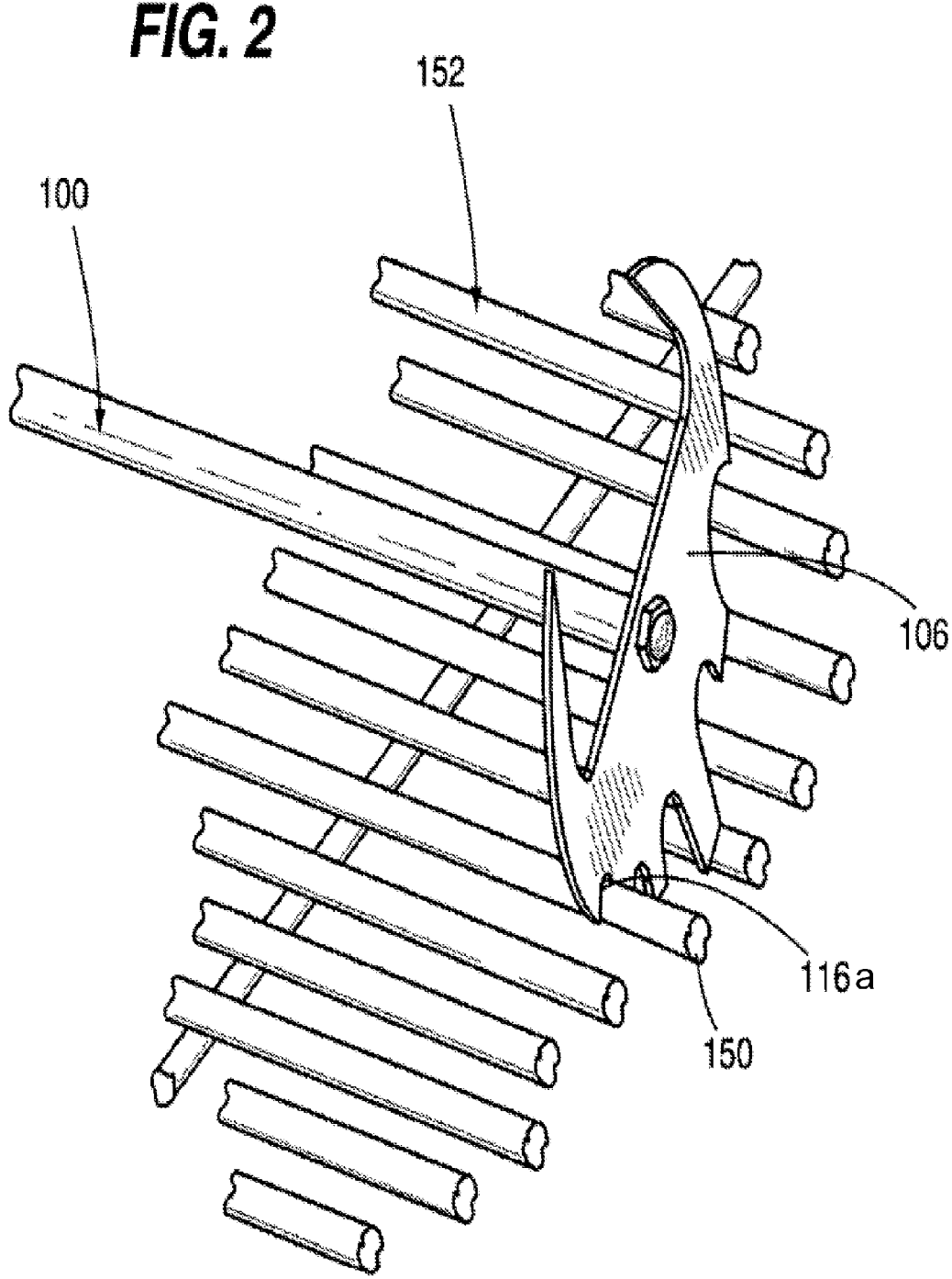
FIG. 2 depicts the multi-purpose cooking tool of FIG. 1 being used for cleaning rails of a grill.

Referring now to FIG. 2, use of the multi-purpose cooking tool 100 for cleaning grill rails 150 of a grill 152 is depicted. The grill rails 150 have an outer diameter approximately the same as the first size recess 116a. Accordingly, the head 106 of the multi-purpose cooking tool 100 is positioned with the first size recess 116a engaged with one of the grill rails 150. By sliding the multi-purpose cooking tool 100 back and forth with respect to the engaged one of the grill rails 150, debris is removed from the engaged one of the grill rails 150 by the head 106 of the multi-purpose cooking tool 100. For a grill having different size grill rails than the grill 152 depicted in FIG. 2, the head 106 of the multi-purpose cooking tool 100 is orientated as necessary to engage a corresponding one of the grill rail engaging recesses 116a-d.

Figure 3:
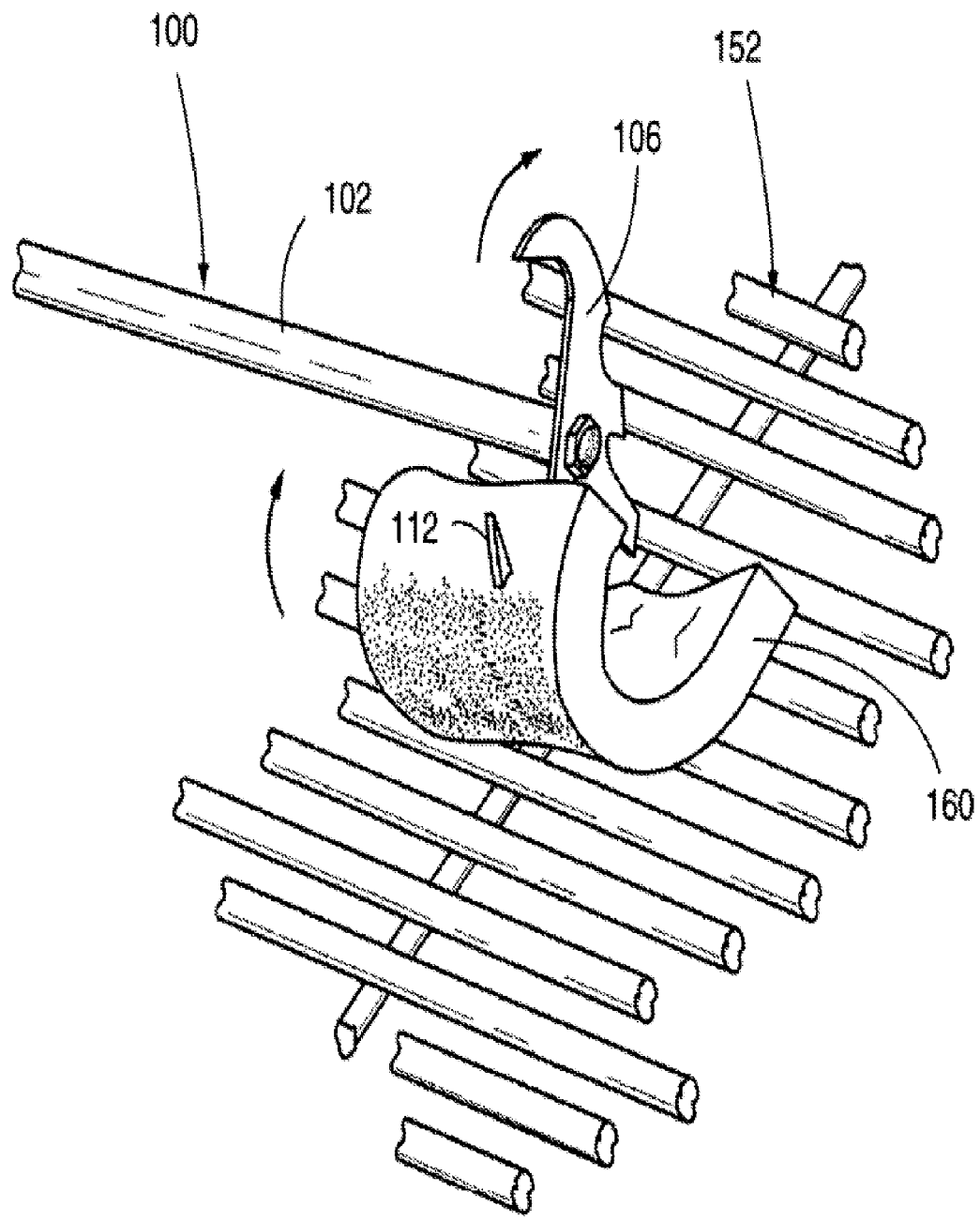
FIG. 3 depicts the multi-purpose cooking tool of FIG. 1 being used for turning over a food item on a grill.

FIG. 3 depicts use of the multi-purpose cooking tool 100 for manipulating a food item 160. After piercing the first hook-like member 112 through the food item 160, the food item 160 is flipped on the grill 152 by rotating the multi-purpose cooking tool 100 counter-clockwise (i.e., as viewed looking down the elongated shaft 104 toward the head 106). This counter-clockwise rotation is the natural rotation for a left-handed person holding the multi-purpose cooking tool 100 in their left hand. Alternatively, a right-handed person will generally have the inclination of engaging a food item with the second hook-like member 114 and rotating the multi-purpose cooking tool 100 clockwise while holding the multi-purpose cooking tool 100 in their right hand.

Accordingly, implementation of the two spaced-apart hook-like members (112, 114), which have opposite curvature with respect to the longitudinal axis L of the elongated shaft 102, results in cooking tools in accordance with the present invention being novel and advantageous relative to conventional cooking tools. Specifically, the two spaced-apart hook-like members (112, 114) enable the multi-purpose cooking tool 100 to be used with equal dexterity by both right-handed users and left-handed users. Right-handed users will generally find best dexterity while holding the multipurpose cooking tool 100 in their right hand, engaging a food item with the second hook-like member 114 and rotating the multi-purpose cooking tool 100 clockwise to turn over the food item. Left-handed users will generally find best dexterity while holding the multi-purpose cooking tool 100 in their left hand, engaging a food item with the first hook-like member 114 and rotating the multipurpose cooking tool 100 counter-clockwise to turn over the food item.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

I claim:

1. A cooking tool head, comprising a flat body having generally parallel opposed faces, the flat body including:
    an integrally formed first hook-like member adapted for piercing and then flipping a food item on a barbecue grill, said first member having a counter-clockwise curvature with respect to a longitudinal reference axis and terminating in a sharp tip, said first hook-like member having an interior edge running the length of the member;

an integrally formed second hook-like member adapted for piercing and then flipping a food item on a barbecue grill, said second member having a clockwise curvature with respect to the longitudinal axis and terminating in a sharp tip, said second hook-like member having an interior edge running the length of the member; and at least one recess formed in the flat body for engaging and removing debris from grill rails;

wherein the first hook-like member and the second hook-like member both curve toward each other so that the tip of the first hook-like member opposes the tip of the second hook-like member.

2. The cooking tool head of claim 1 wherein the first hook-like member, the second hook-like member and said at least one recess are all integral components of a flat body.

3. The cooking tool head of claim 1 wherein:

a plurality of recesses formed in the flat body for engaging and removing debris from grill rails are provided; and a first one of said recesses is of a different size or shape than a second one of said recesses.

4. The cooking tool head of claim 3 wherein each one of said recesses is formed in a common edge portion of the flat body between the said hook-like members.

5. The cooking tool head of claim 1 wherein the first hook-like member and the second hook-like member comprise curved members having sharp tips for piercing and then holding a food item.

6. The cooking tool head of claim 1 wherein the first hook-like member adapted for piercing and then flipping a food item on a barbecue grill comprises a curved member having a sharp tip so that the sharp tip of said first member will pierce and then engage and turn over a food item when the tip of the first member is placed against said food item and the tool is rotated in a counter-clockwise direction, and wherein the second hook-like member adapted for piercing and then flipping a food item on a barbecue grill comprises a curved member having a sharp tip so that the sharp tip of said first member will pierce and then engage and turn over a food item when the tip of the first member is placed against said food item and the tool is rotated in a clockwise direction.

7. A combination multi-purpose cooking tool, comprising:

an elongated shaft having a first end and a second end;

a handle at the first end of the elongated shaft;

a cooking tool head having a flat body with generally parallel opposed faces, the generally parallel opposed faces being substantially perpendicular to the longitudinal axis of the elongated shaft;

first and second food hooking members for piercing and manipulating food items on a grill, said members integrally formed from the flat body of the cooking tool head and located spaced apart from each other at the second end of the elongated shaft, each of and said members being tapered to terminate in a sharp tip and each member being curved toward the other member so that the tip of the first member opposes the tip of the second member;

said first member being curved so that the tip of said first member is curved in a counter-clockwise direction with respect to a longitudinal axis of the elongated shaft and said second member being curved so that the tip of said second member is curved in a clockwise direction with respect to a longitudinal axis of the elongated shaft; and a first recess for engaging and removing debris from grill rails, said first recess integrally formed from the flat body of the cooking tool head and spaced apart from said food engaging members.

8. The multi-purpose cooking tool of claim 7 wherein the first member, the second member and said at least one grill rail engaging recess are all integral components of a flat body.

9. The multi-purpose cooking tool of claim 7 further comprising a second recess for engaging and removing debris from grill rails, said second recess integrally formed from the flat body of the cooking tool head and spaced apart from said food engaging members.

10. The multi-purpose cooking tool of claim 9 wherein said first and second recesses are generally semi-circular in shape and wherein said first and second recesses have different diameters.

11. The multi-purpose cooking tool of claim 8 wherein each one of said recesses is formed in a common edge portion of the flat body between the said first and second members.

12. The cooking tool head of claim 11 wherein the sharp tips of the first and second members curve toward each other.

13. The cooking tool head of claim 11 wherein the sharp tips of the first and second members curve toward each other so that the sharp tip of said first member will pierce and then engage and turn over a food item when the tip of the first member is placed against said food item and the tool is rotated in a counter-clockwise direction and so that the sharp tip of said second member will pierce and then engage and turn over a food item when the tip of the second member is placed against said food item and the tool is rotated in a clockwise direction.

14. The multi-purpose cooking tool of claim 7 wherein each of said members has an interior edge oriented toward the center of the cooking tool head and running the length of the member.

* * * * *